United States Patent
Ushiwata et al.

(10) Patent No.: US 12,168,722 B2
(45) Date of Patent: Dec. 17, 2024

(54) METHOD OF PRODUCING RESIN AND METHOD OF PRODUCING INSULATING STRUCTURE

(71) Applicant: Toshiba Mitsubishi-Electric Industrial Systems Corporation, Tokyo (JP)

(72) Inventors: Kodai Ushiwata, Tokyo (JP); Yu Yamashita, Tokyo (JP); Tetsuo Yoshimitsu, Tokyo (JP); Takahiro Imai, Kanagawa (JP); Hiromitsu Hirai, Kanagawa (JP)

(73) Assignee: TMEIC CORPORATION, Tokyo (JP)

( * ) Notice: Subject to any disclaimer, the term of this patent is extended or adjusted under 35 U.S.C. 154(b) by 286 days.

(21) Appl. No.: 17/634,996

(22) PCT Filed: Dec. 22, 2020

(86) PCT No.: PCT/JP2020/048025
§ 371 (c)(1),
(2) Date: Feb. 14, 2022

(87) PCT Pub. No.: WO2022/044358
PCT Pub. Date: Mar. 3, 2022

(65) Prior Publication Data
US 2022/0356311 A1    Nov. 10, 2022

(30) Foreign Application Priority Data
Aug. 31, 2020   (JP) ................. 2020-146267

(51) Int. Cl.
C08J 3/20      (2006.01)
C08G 59/34    (2006.01)
(Continued)

(52) U.S. Cl.
CPC ............ C08J 3/20 (2013.01); C08G 59/34 (2013.01); C08G 59/42 (2013.01);
(Continued)

(58) Field of Classification Search
CPC .................................... C08J 2363/00
See application file for complete search history.

(56) References Cited

U.S. PATENT DOCUMENTS

| | | | | |
|---|---|---|---|---|
| 2004/0034161 | A1* | 2/2004 | Osada | C08L 63/00 524/588 |
| 2005/0250248 | A1* | 11/2005 | Buchwalter | C08G 65/2654 257/E21.503 |

(Continued)

FOREIGN PATENT DOCUMENTS

| | | |
|---|---|---|
| CN | 101506301 A | 8/2009 |
| JP | 2000-344864 A | 12/2000 |

(Continued)

OTHER PUBLICATIONS

International Search Report and Written Opinion mailed on Apr. 6, 2021, received for PCT Application PCT/JP2020/048025, Filed on Dec. 22, 2020, 8 pages.

(Continued)

Primary Examiner — Robert A Vetere
(74) Attorney, Agent, or Firm — XSENSUS LLP

(57) ABSTRACT

A resin producing method is a method of producing a resin with which an insulating structure formed on an outer peripheral portion of a conductor is impregnated, the method including: a filler mixing step of mixing a nanofiller at a ratio of 15 wt % or more with an epoxy resin to form a mixture; a shear mixing step of causing the mixture to be subjected to shear mixing; a diluent mixing step of mixing a reactive diluent that reduces a viscosity of the epoxy resin, with the mixture after the shear mixing step; and a curing agent mixing step of mixing an acid anhydride curing agent with the mixture after the diluent mixing step.

10 Claims, 12 Drawing Sheets

(51) Int. Cl.
*C08G 59/42* (2006.01)
*H01B 13/00* (2006.01)
*H01B 17/56* (2006.01)
*H02K 3/32* (2006.01)

(52) U.S. Cl.
CPC ......... *H01B 13/0036* (2013.01); *H01B 17/56* (2013.01); *H02K 3/32* (2013.01); *C08J 2363/00* (2013.01)

(56) References Cited

U.S. PATENT DOCUMENTS

| | | | |
|---|---|---|---|
| 2013/0131218 A1 | 5/2013 | Groppel et al. | |
| 2015/0069877 A1 | 3/2015 | Otowa et al. | |
| 2015/0361245 A1* | 12/2015 | Brockschmidt | H01B 3/40 524/556 |
| 2020/0032046 A1* | 1/2020 | Osawa | C08L 63/10 |

FOREIGN PATENT DOCUMENTS

| | | |
|---|---|---|
| JP | 2003-238771 A | 8/2003 |
| JP | 2006-57017 A | 3/2006 |
| JP | 2006-246599 A | 9/2006 |
| JP | 2006-249276 A | 9/2006 |
| JP | 2015-83663 A | 4/2015 |
| JP | 2016-511303 A | 4/2016 |
| JP | 2016-72301 A | 5/2016 |
| JP | 2016-128542 A | 7/2016 |
| JP | 2019-131629 A | 8/2019 |
| WO | 2017/168880 A1 | 10/2017 |

OTHER PUBLICATIONS

Extended European Search Report issued Aug. 9, 2024 in European Patent Application No. 20940481.3.
Takahiro Imai, et al., "Nano- and Micro-filler Combination Enabling Practical Use of Nanocomposite Insulating Materials", 2008 International Symposium on Electrical Insulating Materials (ISEIM 2008), Sep. 7, 2008, pp. 299-302, XP031356204.

* cited by examiner

METHOD OF PRODUCING RESIN AND METHOD OF PRODUCING INSULATING STRUCTURE

CROSS-REFERENCE TO RELATED APPLICATIONS

The present application is based on PCT filing PCT/JP2020/048025, filed Dec. 22, 2020, which claims priority to JP 2020-146267, filed Aug. 31, 2020, the entire contents of each are incorporated herein by reference.

TECHNICAL FIELD

The present invention relates to a method of producing a resin and a method of producing an insulating structure.

BACKGROUND ART

A coil used in a rotary electric machine such as an electric motor or a generator is provided with an insulating structure that prevents a current flowing through a conductor in the coil from leaking to the outside.

As the insulating structure as described above, a structure is known in which an insulating tape including mica or the like is wound around an outer peripheral portion of a conductor, and a space in the insulating tape is impregnated with a resin including a filler made of a metal oxide or the like. The filler functions to suppress the development of an electric tree generated in the insulating tape and improve the insulating performance.

CITATION LIST

Patent Literature

Patent Literature 1: US 2013/0131218 A
Patent Literature 2: JP 2006-246599 A

SUMMARY OF INVENTION

Problems to be Solved by the Invention

The effect of suppressing the development of the electric tree by the filler as described above largely depends on the dispersiveness of the filler. When the dispersiveness of the filler is low, the filler agglomerates in the insulating structure, and the region where the electric tree easily develops (region of only resin) increases, so that the effect of suppressing the development of the electric tree is reduced.

The viscosity of the filler-including resin greatly affects the productivity of the insulating structure. For example, when the viscosity of the resin unintentionally increases, an operation of impregnating the insulating tape or the like with the resin is difficult.

As described above, in order to efficiently produce a high-performance insulating structure, it is important to produce a resin having high dispersiveness and high viscosity stability of the filler.

Therefore, an object of the present invention is to provide a method of producing a resin and a method of producing an insulating structure capable of efficiently producing a high-performance insulating structure.

Means for Solving Problem

An aspect of the present invention is a method of producing a resin with which an insulating structure formed on an outer peripheral portion of a conductor is impregnated, the method including: a filler mixing step of mixing a nanofiller at a ratio of 15 wt % or more with an epoxy resin to form a mixture; a shear mixing step of causing the mixture to be subjected to shear mixing; a diluent mixing step of mixing a reactive diluent that reduces a viscosity of the epoxy resin, with the mixture after the shear mixing step; and a curing agent mixing step of mixing an acid anhydride curing agent with the mixture after the diluent mixing step.

DESCRIPTION OF EMBODIMENTS

Hereinafter, an embodiment of the present invention will be described with reference to the drawings. In the present specification, components according to the embodiment and descriptions of the components may be described in a plurality of expressions. The components and the description thereof are examples, and are not limited by the expression of the present specification. Components may also be identified with names different from those herein. In addition, the component may be described by an expression different from the expression in the present specification.

<Configuration of Rotary Electric Machine>

Figure 1:
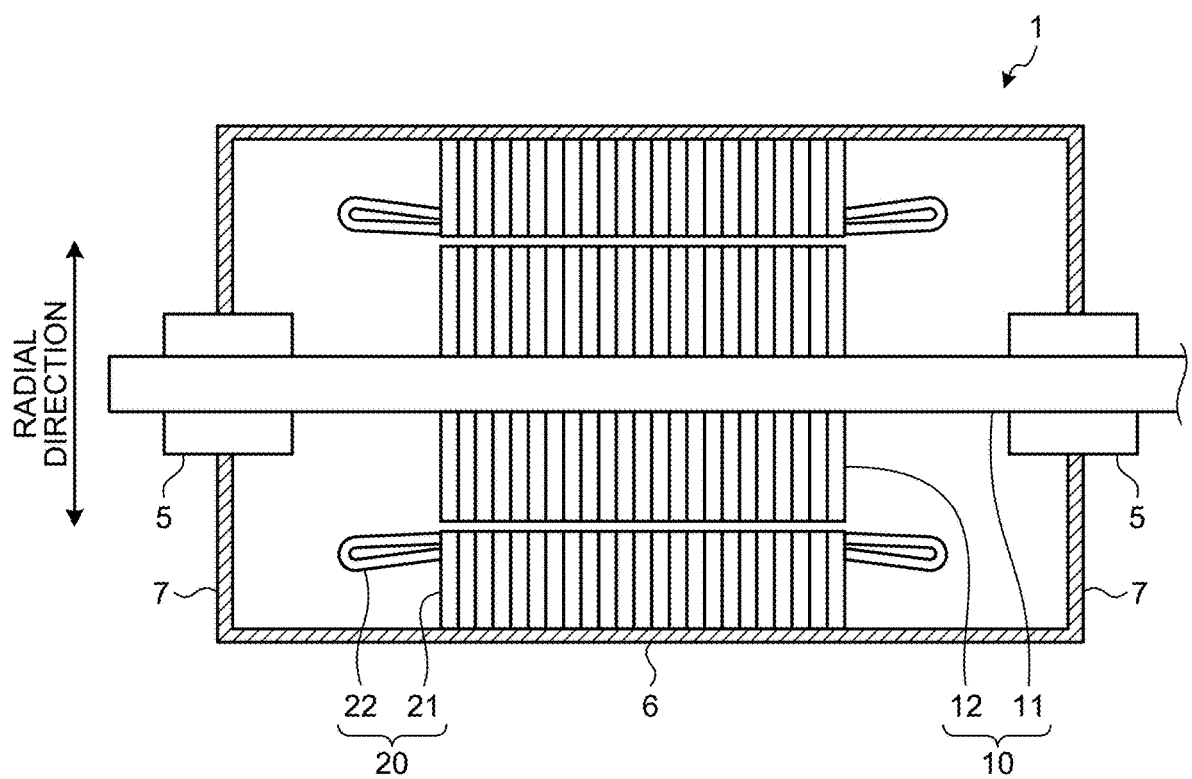
FIG. 1 is a cross-sectional view illustrating a configuration of a rotary electric machine according to the embodiment.

FIG. 1 is a cross-sectional view illustrating a configuration of a rotary electric machine 1 according to the embodiment.

The rotary electric machine 1 includes a rotor 10 and a stator 20. The rotary electric machine 1 is a component such as an electric motor or a generator.

The rotor 10 includes a rotor shaft 11 and a rotor core 12. Near both ends of the rotor shaft 11 are rotatably and axially supported by bearings 5. The bearing 5 is fixed to a bearing bracket 7 provided integrally with a frame 6 constituting the outer frame of the rotary electric machine 1. The rotor core 12 is fixed to the outer peripheral face of the rotor shaft 11 and rotates together with the rotor shaft 11.

The stator 20 includes a stator core 21 and an insulating coil 22. The stator core 21 is disposed radially outward of the rotor core 12 with a gap. The insulating coil 22 is a member that is incorporated in the stator core 21 and generates a magnetic field necessary for the rotary electric machine 1, and an insulating structure described later is provided on an outer peripheral portion thereof. The insulating coil 22 is assembled so as to penetrate the stator core 21.

<Configuration of Insulating Coil>

Figure 2:
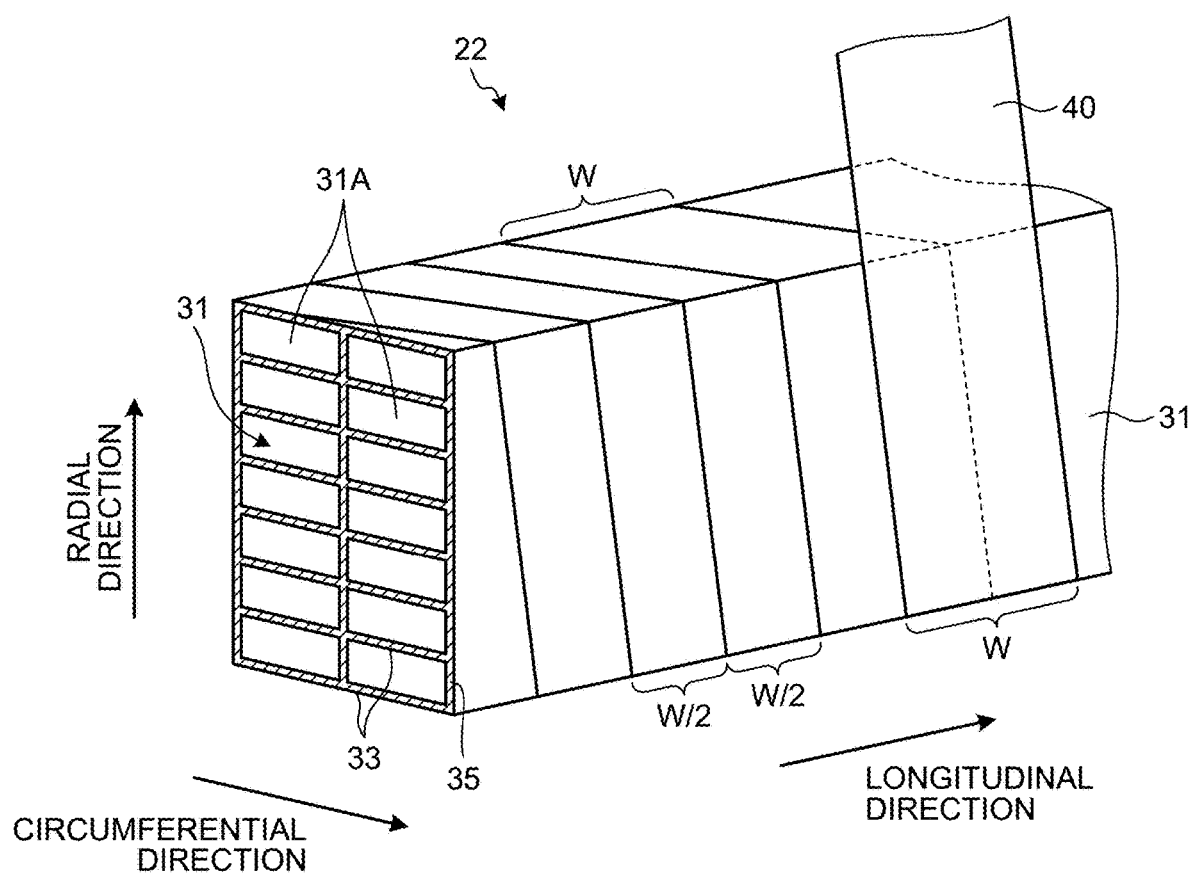
FIG. 2 is a perspective view illustrating a configuration of an insulating coil according to the embodiment.
Figure 3:
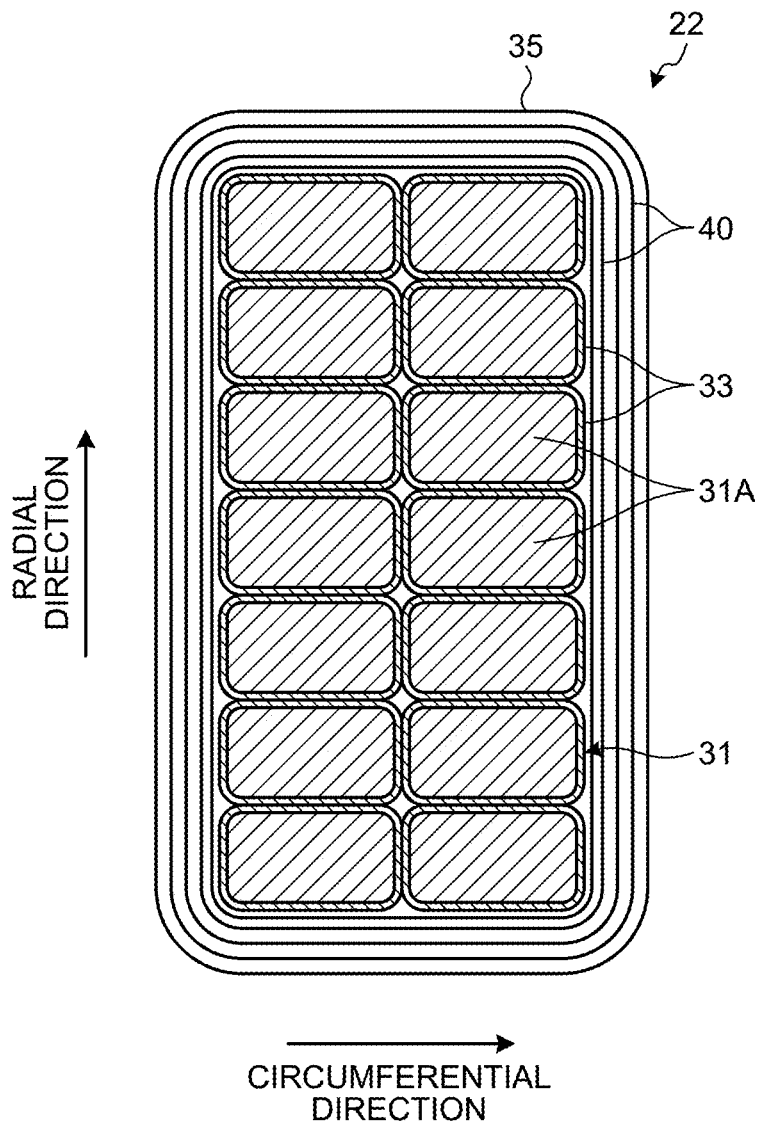
FIG. 3 is a cross-sectional view illustrating a configuration of an insulating coil according to the embodiment.

FIG. 2 is a perspective view illustrating a configuration of the insulating coil 22 according to the embodiment. FIG. 3 is a cross-sectional view illustrating a configuration of the insulating coil 22 according to the embodiment.

The insulating coil 22 includes a laminated conductor 31 (conductor), a turn insulating portion 33, and a main insulating portion 35. The turn insulating portion 33 and the main insulating portion 35 constitute an insulating structure of the insulating coil 22.

The laminated conductor 31 is formed by laminating a plurality of conducting wires 31A. The laminated conductor 31 according to the present embodiment is configured by bundling 14 (the number of lamination: 7, the number of columns: 2) conducting wires 31A. Note that the configuration of the laminated conductor 31 is not limited thereto, and should be appropriately designed according to the use situation. The laminated conductor 31 may include, for example, more than 14 conducting wires 31A, or may be configured by laminating only one conducting wire 31A.

The turn insulating portion 33 is provided on an outer face of each conducting wire 31A. As a result, the outer face of the laminated conductor 31 is covered with the turn insulating portion 33. The main insulating portion 35 is provided outside the turn insulating portion 33. The main insulating portion 35 is configured by winding a main insulating tape 40 (tape-shaped member).

The main insulating tape 40 according to the present embodiment is spirally wound by a half lap method. When the width of the main insulating tape 40 is W, the pitch of the spiral is W/2. That is, the main insulating tape 40 is wound so as to overlap a half of the main insulating tape 40 wound in the previous turn. After one round of winding of the laminated conductor 31 in the entire longitudinal direction is completed, the main insulating tape 40 may be wound so as to be further superimposed thereon. As a result, the main insulating tape 40 can be formed in a multilayer shape. As the number of layers of the main insulating tape 40 increases, the insulating performance can be improved. The number of windings of the main insulating tape 40 may be appropriately selected according to required insulating performance and the like.

Figure 4:
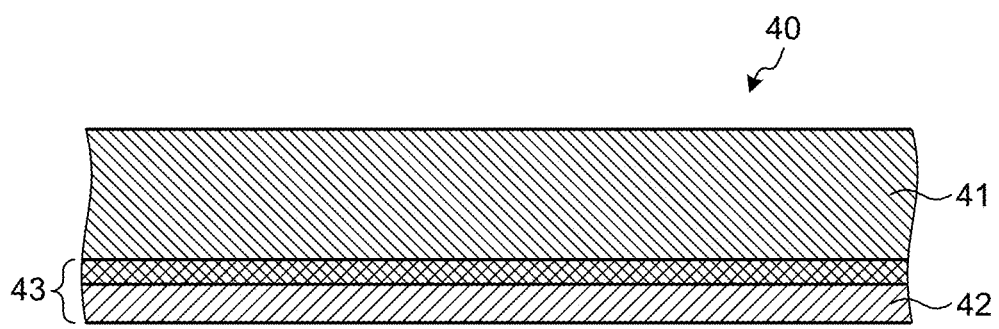
FIG. 4 is a cross-sectional view schematically illustrating a configuration of a main insulating tape according to the embodiment.

FIG. 4 is a cross-sectional view schematically illustrating a configuration of the main insulating tape 40 according to the embodiment.

Main insulating tape 40 includes a main insulating layer 41, a fiber reinforced layer 42, and a polymer layer 43.

The main insulating layer 41 is made of a non-conductive material, and is a main portion for realizing an insulating function of the main insulating tape 40. The fiber reinforced layer 42 is a portion that supports the main insulating layer 41 and has a function of securing strength of the main insulating tape 40 as a whole. The polymer layer 43 is a portion that includes a bonding polymer, penetrates the fiber reinforced layer 42, and has a function of bonding the fiber reinforced layer 42 and the main insulating layer 41.

The main insulating layer 41 includes, for example, an inorganic material such as mica, asbestos, or a ceramic powder as a main component. The fiber reinforced layer 42 includes, for example, glass fiber, polyester fiber, or the like as a main component, and is usually woven in a mesh shape. In addition, the fiber reinforced layer 42 is not limited to fibers, and may be formed as a nonwoven fabric or may be formed of a polymer film such as polyester or polyimide. The polymer layer 43 includes, for example, an unsaturated polyester resin, an epoxy resin, a polyimide resin, or the like as a main component.

The thickness of the main insulating layer 41 is, for example, about 100 µm. The thickness of the fiber reinforced layer 42 is thinner than that of the main insulating layer 41, and is, for example, about 30 µm or less in many cases. In FIG. 4, the polymer layer 43 is illustrated as a constituent element of the main insulating tape 40, but since the polymer layer 43 penetrates the fiber reinforced layer 42, the polymer layer 43 has almost no thickness. Therefore, the main insulating layer 41 and the fiber reinforced layer 42 are usually almost in contact with each other. Usually, the main insulating tape 40 is wound with the main insulating layer 41 facing the laminated conductor 31 to be insulated and the fiber reinforced layer 42 facing outward, but in some cases, the other way around.

<Internal Structure of Main Insulating Portion>

Figure 5:
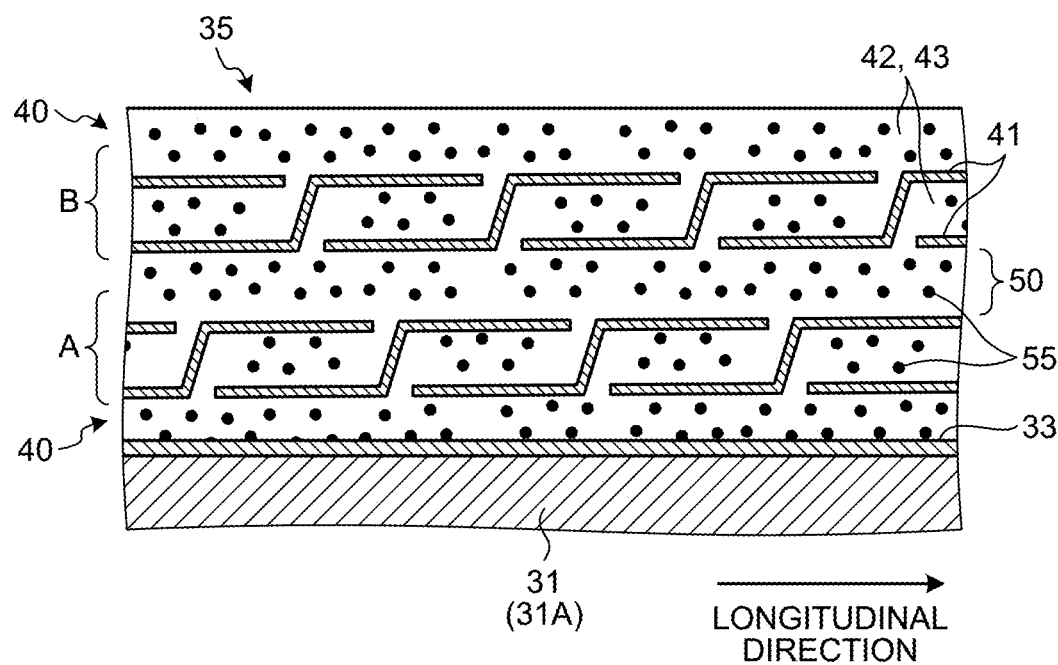
FIG. 5 is a cross-sectional view schematically illustrating an internal structure of a main insulating portion according to the embodiment.

FIG. 5 is a cross-sectional view schematically illustrating an internal structure of the main insulating portion 35 according to the embodiment.

FIG. 5 illustrates a cross section along the longitudinal direction of the laminated conductor 31 (conducting wires 31A). FIG. 5 illustrates a case where main insulating tape 40 is wound twice, and the main insulating portion 35 includes a taping layer A formed by a first time winding and a taping layer B formed by a second time winding.

The main insulating portion 35 includes the main insulating layer 41 and an impregnated portion 50. In each of the taping layer A and the taping layer B, the main insulating layers 41 adjacent to each other in the longitudinal direction overlap each other by a half of the width. This is due to the winding method of the half lap method.

The impregnated portion 50 is a portion formed by permeation of a resin including a nanofiller 55 into or around the polymer layer 43 that joins the main insulating layer 41 and the fiber reinforced layer 42. In FIG. 5, in order to emphasize the fiber reinforced layer 42 or the polymer layer 43 formed by penetrating around the fiber reinforced layer, the thickness of the main insulating layer 41 is expressed to be thin, and the line indicating the fiber reinforced layer 42 is omitted. As illustrated in FIG. 5, the periphery of the main insulating layer 41 is covered with the impregnated portion 50 (polymer layer 43) in which the nanofiller 55 is dispersed. Further, the resin including the nanofiller 55 also penetrates the main insulating layer 41, but the expression thereof is omitted in FIG. 5.

The nanofiller 55 includes non-conductive nano-order particles, for example, particles including a metal oxide. The particle size of the nanofiller 55 is preferably 50 nm or less. Specific examples of the substance constituting the nanofiller 55 will be described later.

Figure 6:
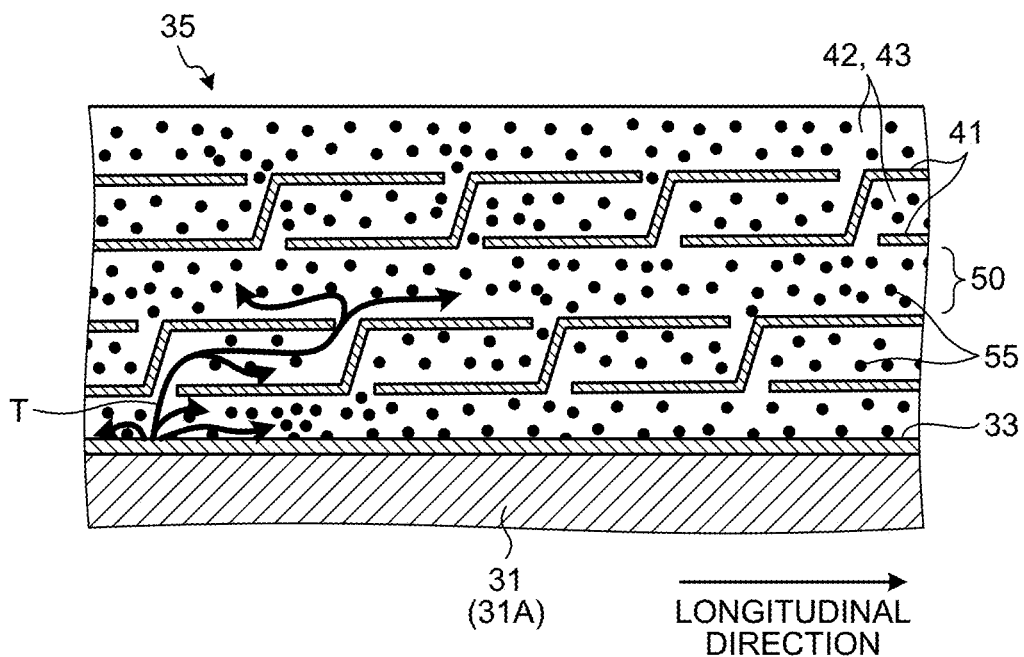
FIG. 6 is a cross-sectional view schematically illustrating an effect of a nanofiller according to the embodiment.

FIG. 6 is a cross-sectional view schematically illustrating the effect of the nanofiller 55 according to the embodiment.

FIG. 6 illustrates a state in which the electric tree T is generated in the impregnated portion 50. The electric tree T is an electrical deterioration phenomenon caused by a voltage applied to the laminated conductor 31 and the stator 20. When the electric tree T develops and reaches the surface layer portion of the main insulating portion 35, dielectric breakdown occurs, and the rotary electric machine 1 stops its operation.

The nanofiller 55 dispersed in the impregnated portion 50 has a development suppressing effect of suppressing the linear development of the electric tree T and reducing the development speed of the electric tree T. Thus, the insulating performance of the main insulating portion 35 can be improved. Such a development suppressing effect changes not only depending on the content of the nanofiller 55 but also strongly depending on dispersiveness. The development suppressing effect increases as dispersiveness (uniformity of dispersion) of the nanofiller 55 in the impregnated portion 50 increases. Therefore, in order to improve the development suppressing effect (insulating performance), it is important to use a resin having high dispersiveness of the nanofiller 55.

<Method of Producing Insulating Structure>

Figure 7:
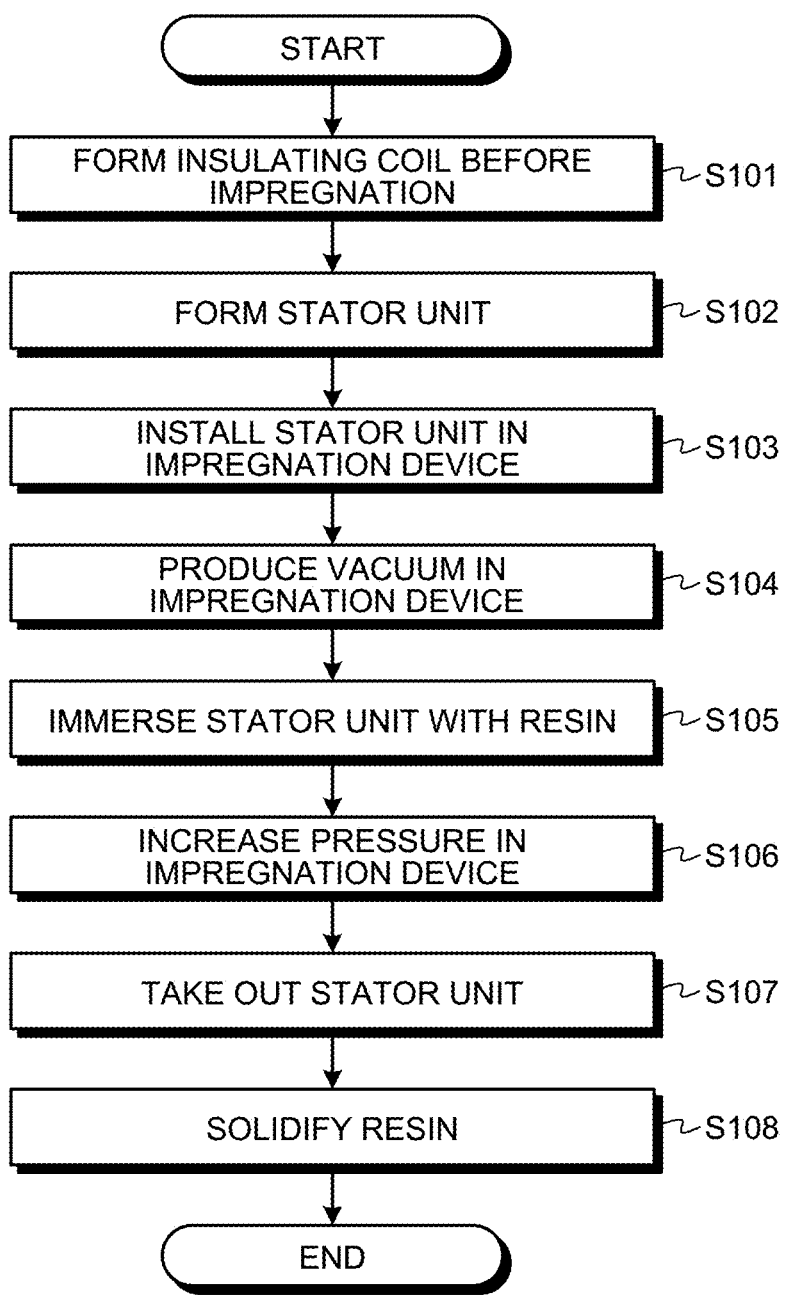
FIG. 7 is a flowchart illustrating a procedure in the method of producing the insulating structure of the insulating coil according to the embodiment.
Figure 8:
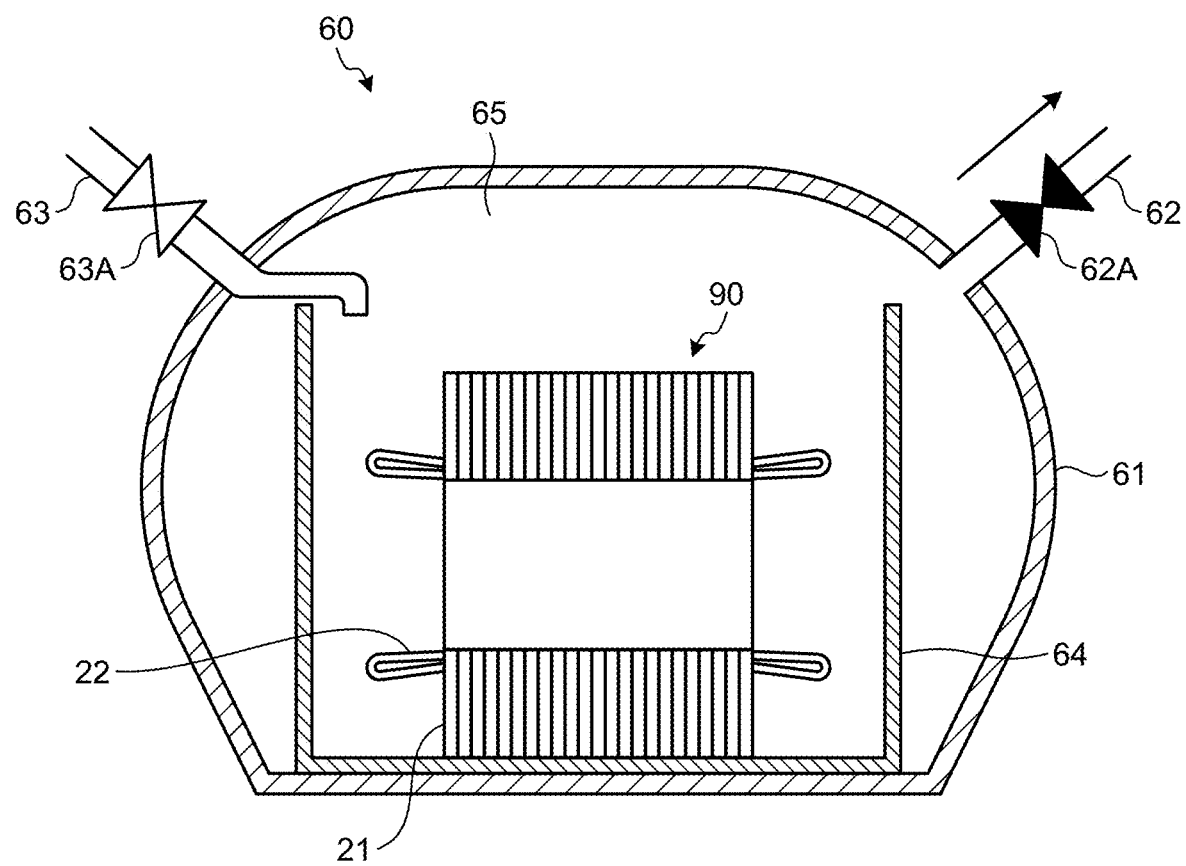
FIG. 8 is a diagram illustrating a state in the first half stage of the impregnation device used in the method of producing the insulating structure according to the embodiment.
Figure 9:
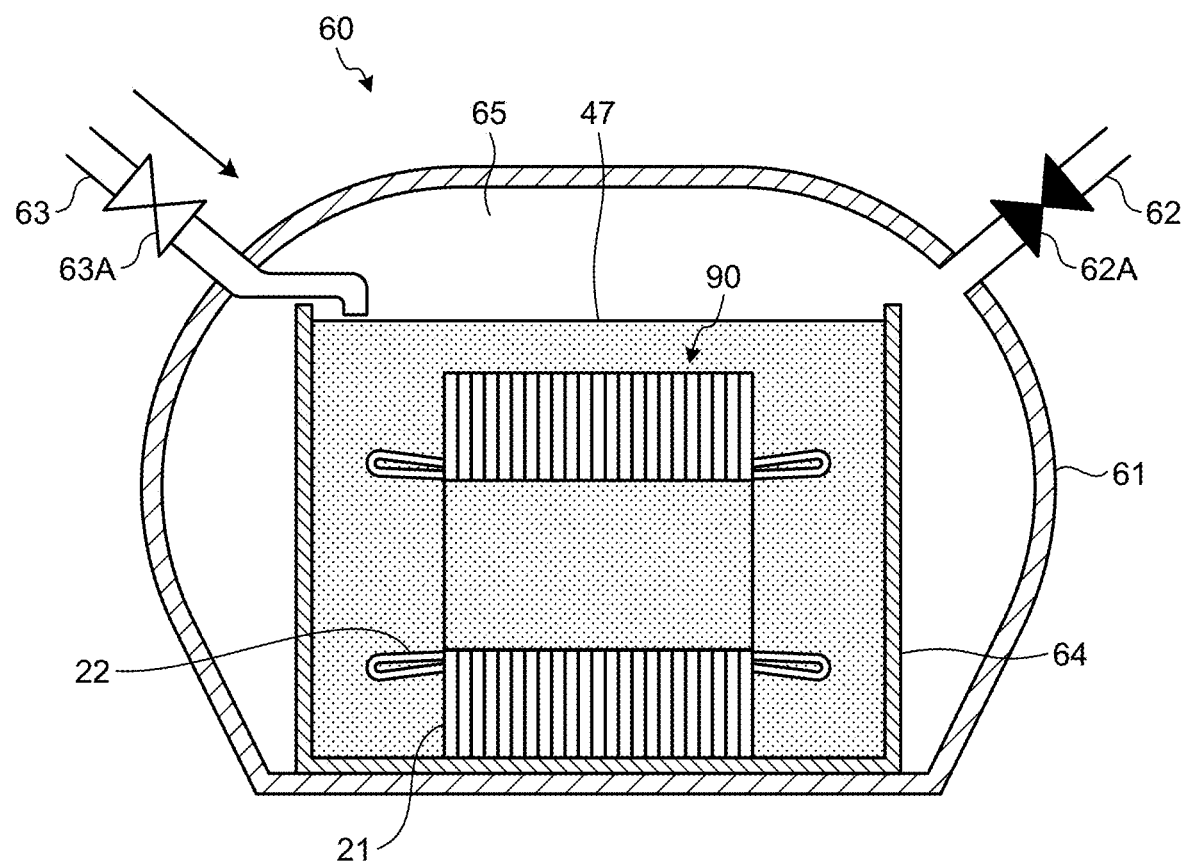
FIG. 9 is a diagram illustrating a state in the second half stage of the impregnation device used in the method of producing the insulating structure according to the embodiment.

FIG. 7 is a flowchart illustrating a procedure in the method of producing the insulating structure of the insulating coil 22 according to the embodiment. FIG. 8 is a diagram illustrating a state in the first half stage of an impregnation device 60 used in the method of producing the insulating structure according to the embodiment. FIG. 9 is a diagram illustrating a state in the second half stage of the impregnation device 60 used in the method of producing the insulating structure according to the embodiment.

First, the main insulating tape 40 is wound around the laminated conductor 31 (see FIG. 2), and the insulating coil 22 before resin impregnation is formed (S101). Thereafter, the insulating coil 22 before resin impregnation is inserted into the stator core 21 and assembled to form a stator unit 90 (see FIG. 8) (S102). Thereafter, the stator unit 90 is installed in the impregnation device 60 (S103), and the inside of the impregnation device 60 is evacuated (S104).

As illustrated in FIG. 8, the impregnation device 60 includes a container 61, an exhaust pipe 62, an exhaust valve 62A, a supply pipe 63, a supply valve 63A, and a treatment tank 64. In step S103, the stator unit 90 is installed in the treatment tank 64 placed in the container 61. Thereafter, in step S104, vacuum is produced in the container 61. When evacuation is performed, the supply valve 63A is closed, and air in the container 61 is sucked by a suction device connected to the exhaust pipe 62. As a result, the inside of the insulating coil 22 is in a vacuum state even in the space in the turn insulating portion 33 and the main insulating tape 40 wound around the turn insulating portion.

After the producing the vacuum is performed as described above, as illustrated in FIG. 9, the stator unit 90 in the treatment tank 64 is immersed in a resin 47 (S105). At this time, the exhaust valve 62A is closed, and the resin 47 is supplied from the supply pipe 63 into the treatment tank 64. The resin 47 is supplied so that the entire stator unit 90 is immersed.

After the stator unit 90 is immersed in the resin 47 as described above, the pressure in the impregnation device 60 (container 61) is increased (S106). As illustrated in FIG. 9, the increasing the pressure is performed by opening the supply valve 63A and supplying a pressurized gas 65 from the supply pipe 63 into the container 61. The pressurized gas 65 is preferably a substance that does not react with the resin 47, and is preferably an inert gas such as nitrogen gas or dry air. Increasing the pressure in the container 61 causes the resin 47 including the nanofiller 55 to be impregnated into the turn insulating portion 33 and the main insulating tape 40 of the insulating coil 22.

Thereafter, the stator unit 90 is taken out from the impregnation device 60 (S107), and the resin 47 impregnated in the insulating coil 22 including the main insulating tape 40 is solidified (S108). The method of solidifying the resin 47 is determined according to the properties of the epoxy resin to be used. For example, when a thermosetting epoxy resin is used, a method of housing the stator unit 90 in a drying furnace having a predetermined temperature for a predetermined time is performed, and the stator 20 is finally obtained (see FIG. 1). Thereafter, the stator 20 is attached to the frame 6 constituting the outer frame. Depending on the specifications of the rotary electric machine 1, the insulating coil 22 may be assembled in the stator core 21 previously attached to the frame 6. In this case, the assembly of the frame 6, the stator core 21, and the insulating coil 22 is treated as the stator unit 90.

<Method of Producing Resin>

Hereinafter, a method of producing the resin 47 impregnated into the main insulating tape 40 will be described. As described above, in order to improve the effect of suppressing the development of the electric tree T by the nanofiller 55 (insulating performance of the main insulating portion 35), it is necessary to form the impregnated portion 50 in which the nanofiller 55 is dispersed with high dispersiveness (uniformity) in the main insulating tape 40. In order to form such an impregnated portion 50, it is important to produce and use the resin 47 having high dispersiveness of the nanofiller 55.

The resin 47 according to the present embodiment is a composition produced by mixing an epoxy resin, the nanofiller 55, a reactive diluent, and an acid anhydride-based curing agent (curing agent).

The epoxy resin includes a compound which includes two or more three-membered rings composed of two carbon atoms and one oxygen atom in one molecule and can be cured. The epoxy resin includes, for example, a bisphenol A type epoxy resin, an alicyclic epoxy resin, a bisphenol F type epoxy resin, a biphenyl type epoxy resin, a naphthalene type epoxy resin, a novolac type epoxy resin, a phenol novolac type epoxy resin, or the like as a main component. The epoxy resin may include these compounds singly or in combination of two or more kinds thereof. Specifically, the epoxy resin preferably includes an alicyclic epoxy resin from the viewpoint of chemical affinity with the reactive diluent.

The nanofiller 55 includes a non-conductive metal oxide or the like. The nanofiller 55 includes, for example, alumina, silica, titanium oxide, magnesium oxide, bismuth trioxide, cerium dioxide, cobalt monoxide, copper oxide, iron trioxide, holmium oxide, indium oxide, manganese oxide, tin oxide, yttrium oxide, zinc oxide, or the like as a main component. The nanofiller 55 may include these compounds singly, or in combination of two or more kinds thereof. The surface of the nanofiller 55 may be modified with a coupling agent for the purpose of improving dispersiveness in an epoxy resin, preventing re-aggregation, improving adhesiveness, and the like.

The reactive diluent reduces the viscosity of the epoxy resin by reacting with the epoxy resin. The reactive diluent includes a compound that can be part of the skeleton in the cured product of the thermosetting resin composition by having a reactive group in the molecular skeleton. The reactive diluent includes, for example, butyl glycidyl ether, 1,4-butanediol diglycidyl ether, alkylene monoglycidyl ether, alkylphenol monoglycidyl ether, polypropylene glycol diglycidyl ether, alkylene diglycidyl ether, neopentyl glycol diglycidyl ether, 1,6-hexanediol diglycidyl ether, 1,12 dodecanediol diglycidyl ether, o-cresyl glycidyl ether, 1,2-epoxytetradecane, or the like as a main component. The reactive diluent may include these compounds singly or in combination of two or more thereof. Specifically, when the epoxy resin includes an alicyclic epoxy resin, the reactive diluent preferably includes butyl glycidyl ether.

The acid anhydride-based curing agent includes, for example, 4-methylhexahydrophthalic anhydride, hexahydrophthalic anhydride, tetrahydrophthalic anhydride, 4-methyltetrahydrophthalic anhydride, tetrabromophthalic anhydride, nadic anhydride, methyl nadic anhydride, trimellitic anhydride, pyromellitic anhydride, methylhymic anhydride, or the like as a main component. The acid anhydride-based curing agent may include these compounds singly or in combination of two or more kinds thereof.

A curing accelerator may be used to accelerate the reaction in the step of solidifying (curing) the resin 47 in a drying furnace or the like. The curing accelerator includes, for example, a compound capable of accelerating the crosslinking reaction between the epoxy compound and the acid anhydride-based curing agent. The curing accelerator includes, for example, a metal chelate compound, an ammonium ion compound, an imidazole compound, or the like as a main component. The curing accelerator may include these compounds singly or in combination of two or more kinds thereof.

The resin 47 includes, for example, an epoxy resin, a nanofiller 55, a reactive diluent, and an acid anhydride-based curing agent in the following proportions.

Epoxy resin: 30 wt % to 60 wt % (1)
Acid anhydride-based curing agent: 30 wt % to 60 wt % (2)
Reactive diluent: 5 wt % to 30 wt % (3)
Nanofiller 55: 2 wt % to 30 wt % with respect to the entire mixture of (1) to (3)

Figure 10:
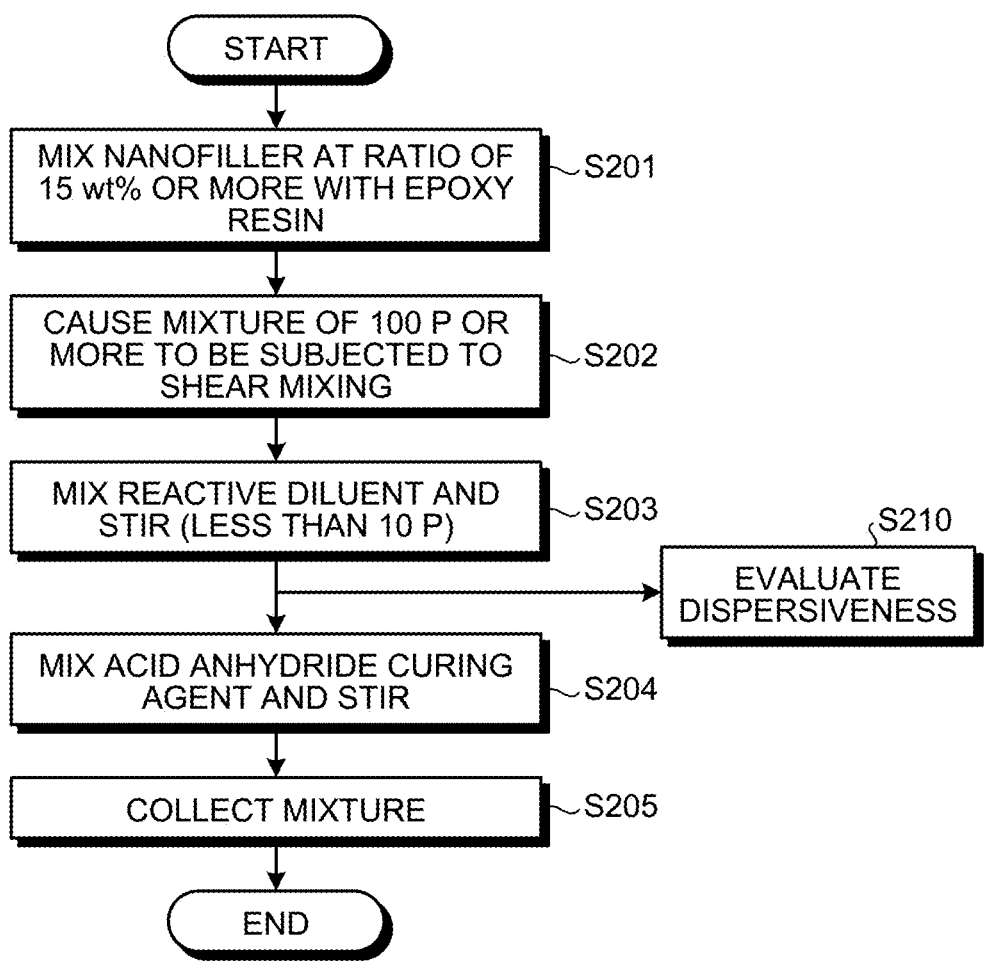
FIG. 10 is a flowchart illustrating a procedure in the method of producing a resin according to the embodiment.

FIG. 10 is a flowchart illustrating a procedure in the method of producing the resin 47 according to the embodiment.

First, the nanofiller 55 at a ratio of 15 wt % or more is mixed with the epoxy resin (filler mixing step: S201). The ratio (15 wt % or more) is a ratio of the weight of the nanofiller 55 to the weight of the epoxy resin. The filler mixing step is preferably performed so that the mixture produced in this step has a viscosity of 100 P (poise: dPa·s) or more. As described above, in the method of producing the resin 47 according to the present embodiment, first, the nanofiller 55 at a ratio of the predetermined value (15 wt %) or more is mixed with the epoxy resin to generate a mixture having a viscosity of the predetermined value (100 P) or more.

Thereafter, the mixture of 100 P or more is subjected to shear mixing (shear mixing step: S202). Shear mixing of the mixture can be performed better when the viscosity is relatively high than when the viscosity is relatively low. The shear mixing step is performed using an appropriate apparatus capable of generating a shear stress in the mixture, and is performed using, for example, a three-roll mill mixer, a planetary mixer (planetary stirrer), a LABO PLASTOMILL mixer (registered trademark), a Miracle KCK mixer (registered trademark), or the like.

Thereafter, the reactive diluent is mixed with the mixture subjected to shear mixing and stirred (diluent mixing step: S203). The diluent mixing step is preferably performed so that the viscosity of the mixture (composition) produced in this step is less than 10 P. The stirring in the diluent mixing step can be performed using an appropriate apparatus capable of high-speed stirring, and is performed using, for example, a disper mixer, a concentric biaxial mixer, a planetary mixer, a bead mill mixer, or the like.

Here, the dispersiveness of the nanofiller 55 is evaluated on the mixture with less than 10 P produced by the diluent mixing step (S203) (dispersiveness evaluation step: S210). As a method of evaluating the dispersiveness of the nanofiller 55, for example, there is a method of irradiating the mixture with a laser pointer. Since the nanofiller 55 in the mixture scatters the light of the laser pointer (Tyndall phenomenon), when the laser pointer is directed toward the mixture, a trajectory of light may appear in the mixture. For example, when the mixture is irradiated with red light having a wavelength of 635 nm to 690 nm, in a case where the particle size of the nanofiller 55 is larger than the wavelength, a trajectory of light clearly appears in the mixture. On the other hand, in a case where the particle diameter of the nanofiller 55 is smaller than the wavelength, the trajectory of light is hardly visible. Therefore, it can be evaluated that the dispersiveness of the nanofiller 55 in the mixture is higher as the luminosity of the trajectory of light appearing in the mixture is lower. When the mixture generated through steps S201 to S203 is irradiated with red light, the trajectory of light in the mixture is hardly visible, and the luminous intensity is extremely low. The method using a laser pointer is simple and convenient, while various particle size measurement devices that measure the particle size of the nanofiller 55 from Brownian motion or the like in the mixture may be used.

Thereafter, the acid anhydride curing agent is mixed with the mixture of less than 10 P generated by the diluent mixing step (S203), and the mixture is stirred (curing agent mixing step: S204). The acid anhydride curing agent is mixed with the same extent with the epoxy resin used in terms of chemical equivalents. At this time, as described above, a curing accelerator (catalyst) for accelerating the curing reaction between the epoxy resin and the acid anhydride curing agent may be added. The curing agent mixing step is performed so that the composition has a predetermined viscosity (for example, a viscosity practically suitable as the resin 47 for impregnation). The stirring in the curing agent mixing step can be performed using the device similar to that in the diluent mixing step (S203).

The curing agent mixing step (S204) may be performed when the dispersiveness of the nanofiller 55 is evaluated to satisfy a predetermined criterion in the dispersiveness evaluation step (S210). For example, step S104 may be performed in a case where the luminosity of the trajectory of light appearing in the mixture in a method using a laser pointer is equal to or less than a threshold value.

Thereafter, the mixture generated by the curing agent mixing step (S204) is collected (S205). The collected mixture is used as the resin 47 for impregnation as described above.

By the above producing method, the resin 47 in which the nanofiller 55 is dispersed with high dispersiveness can be produced. As a result, the effect of suppressing the development of the electric tree T by the nanofiller 55 (insulating performance) can be improved. In addition, due to the high dispersiveness of the nanofiller 55, the viscosity of the resin 47 can be stabilized over a long period of time, and the pot life of the resin 47 can be improved.

Hereinafter, a method of producing a resin according to the comparative example will be described.

Figure 11:
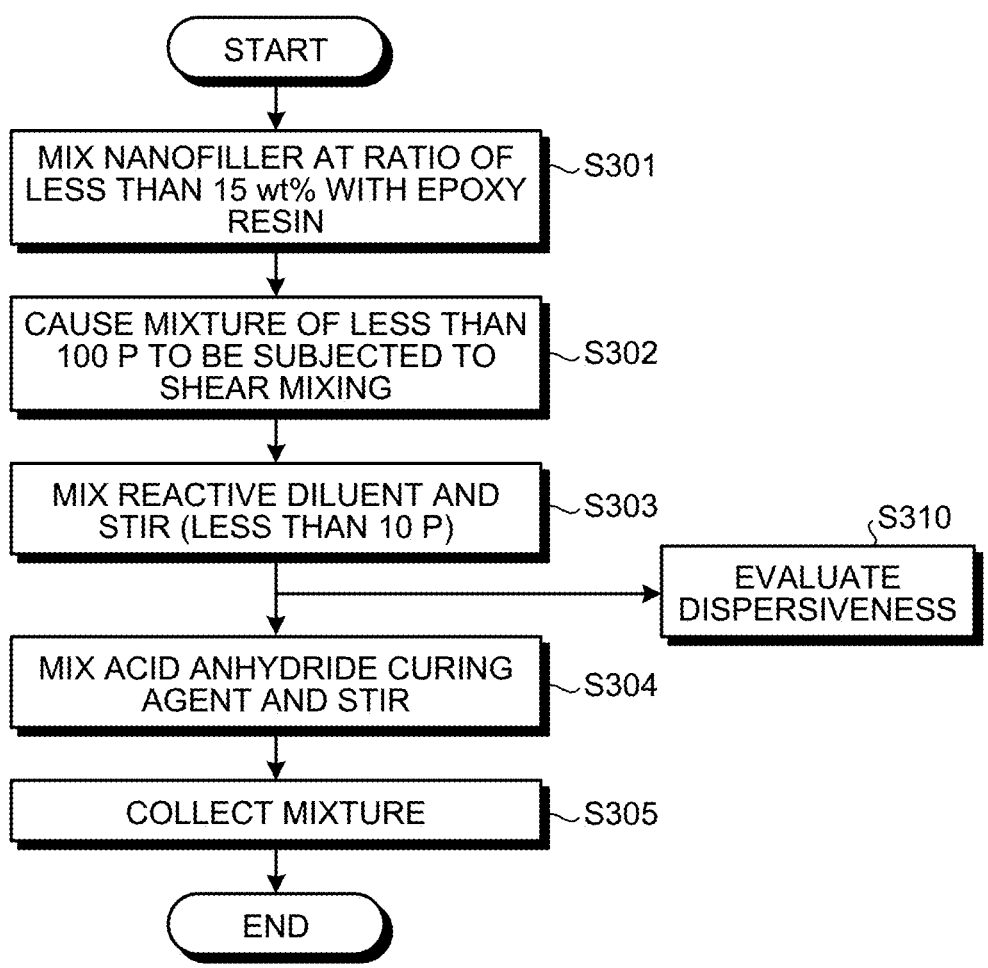
FIG. 11 is a flowchart illustrating a procedure in a method of producing a resin according to the first comparative example.

FIG. 11 is a flowchart illustrating a procedure in a method of producing a resin according to the first comparative example.

In the production method according to the first comparative example, the proportion of the nanofiller to be mixed with the epoxy resin is made smaller than that in the above embodiment.

First, the nanofiller at a ratio of less than 15 wt % is mixed with an epoxy resin (S301). The viscosity of the mixture produced by this step will be less than 100 P.

Thereafter, the mixture of less than 100 P is subjected to shear mixing (S302). The method of shear mixing here is similar to that in step S202 in the above embodiment.

Thereafter, the reactive diluent is mixed with the mixture subjected to shear mixing and stirred (S303). The step is performed such that the viscosity of the mixture is less than 10 P. The method of mixing and stirring here is similar to that in step S203 in the above embodiment.

Here, the dispersiveness of the nanofiller is evaluated on the mixture of less than 10 P produced in step S303 (S310). The evaluation method here is similar to that in step S210 in the above embodiment. When the mixture generated through steps S301 to S303 is irradiated with red light, the trajectory of light in the mixture is clearly visible, and the luminous intensity is relatively high. This is because, since the mixing ratio of the nanofiller is set to less than 15 wt % in step S301, as described above, the viscosity of the mixture is less than 100 P, and a high shear stress is not applied to the mixture.

Thereafter, the acid anhydride curing agent is mixed with the mixture of less than 10 Pgenerated in step S303, and the mixture is stirred (curing agent mixing step: S304). The method of mixing and stirring here is similar to that in step S204 in the above embodiment.

Thereafter, the mixture generated in step S304 is collected (S305).

Figure 12:
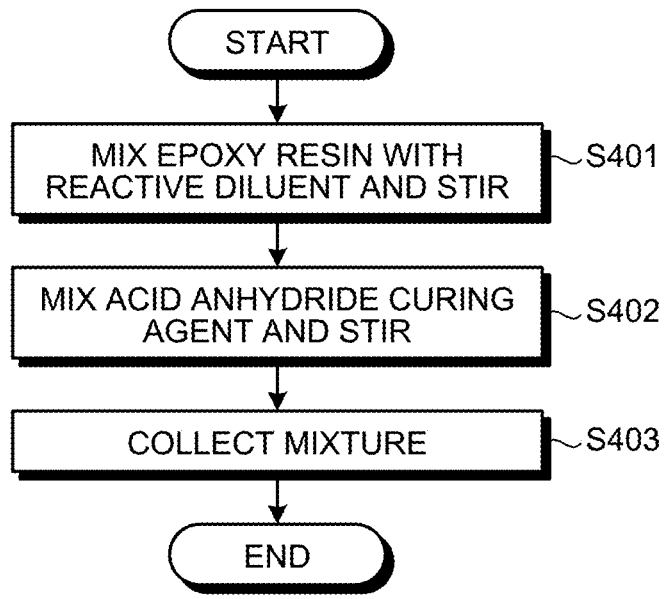
FIG. 12 is a flowchart illustrating a procedure in a method of producing a resin according to the second comparative example.

FIG. 12 is a flowchart illustrating a procedure in a method of producing a resin according to the second comparative example.

The producing method according to the second comparative example produces a resin including no nanofiller.

First, a reactive diluent is mixed with the epoxy resin and stirred (S401).

Thereafter, the acid anhydride curing agent is mixed with the mixture generated in step S401, and the mixture is stirred (S402).

Thereafter, the mixture generated in step S402 is collected (S403).

<Evaluation of Insulation Life>

Hereinafter, the insulation life of the insulating structure impregnated with the resin produced by each of the production methods of the above-described embodiment, the first comparative example, and the second comparative example is evaluated.

Figure 13:
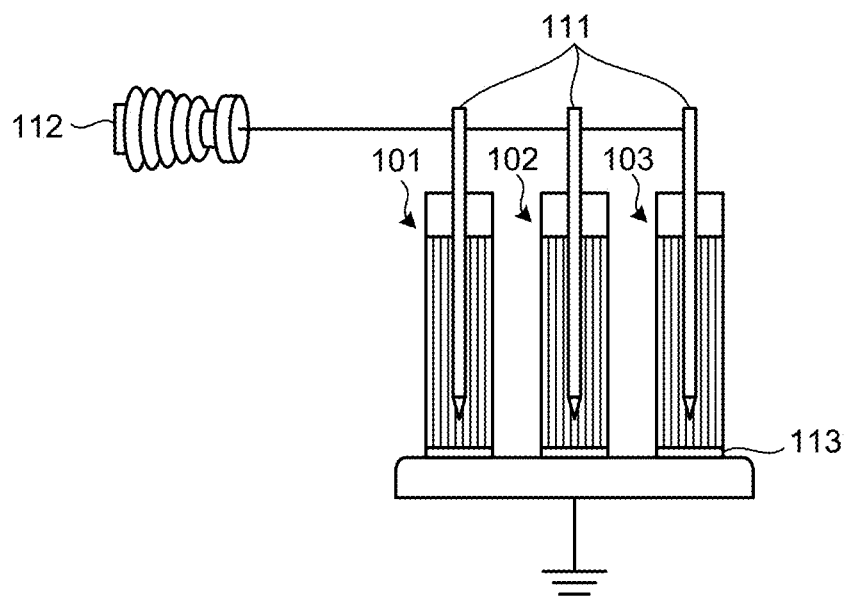
FIG. 13 is a diagram illustrating a test method of an insulation life.

FIG. 13 is a diagram illustrating a test method of the insulation life.

First, a test piece 101 impregnated with the resin 47 according to the embodiment, a test piece 102 impregnated with the resin according to the first comparative example, and a test piece 103 impregnated with the resin according to the second comparative example are prepared. Each test piece 101 to 103 is obtained by sandwiching a needle-shaped electrode 111 between several tens of mica tapes stacked, and bringing an end of the mica tape into contact with a ground electrode 113. The mica tape of the leftmost test piece 101 is pressure-impregnated with the resin 47 according to the embodiment and thermally cured. The mica tape of the center test piece 102 is pressure-impregnated with the resin according to the first comparative example and thermally cured. The mica tape of the test piece 103 at the right end is pressure-impregnated with the resin according to the second comparative example and thermally cured. A high voltage is applied from the voltage generator 112 to each electrode 111, and the time until each test piece 101 to 103 reached the dielectric breakdown is measured.

Figure 14:
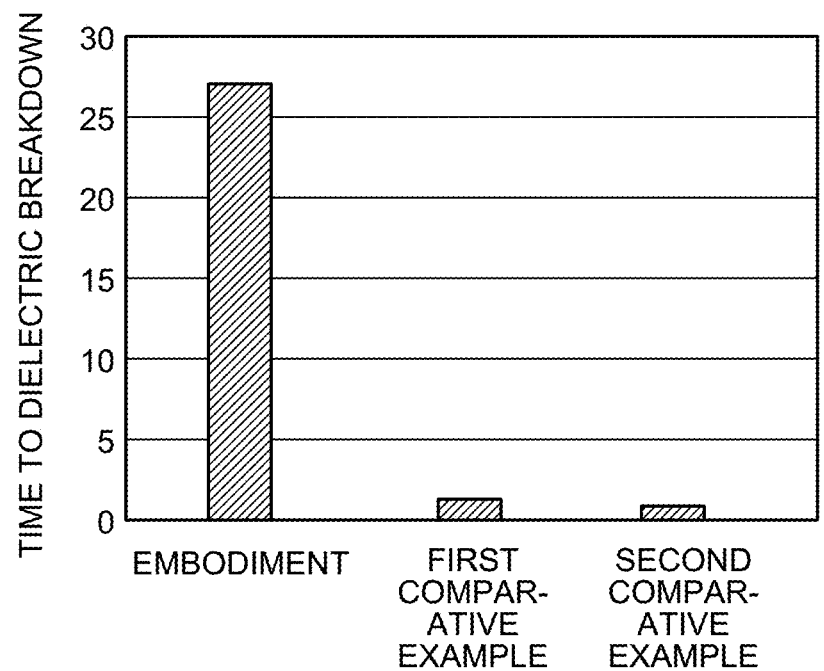
FIG. 14 is a graph illustrating a comparison result of the time until the insulating structure reaches the dielectric breakdown in the embodiment, the first comparative example, and the second comparative example.

FIG. 14 is a graph illustrating a comparison result of the time until the insulating structure reaches the dielectric breakdown in the embodiment, the first comparative example, and the second comparative example.

The value on the vertical axis illustrated in FIG. 14 is a relative value when the value of the second comparative example is one. As illustrated in FIG. 14, the time until the insulating structure including the resin 47 according to the embodiment reaches the dielectric breakdown is 25 times or more longer than that the times according to the first comparative example and the second comparative example.

The above results are attributed to the fact that the dispersiveness of the nanofiller 55 included in the resin 47 according to the embodiment is higher than that in the first comparative example. Such improvement of the dispersiveness of the nanofiller 55 is mainly realized by performing the filler mixing step (S101) and the shear mixing step (S102) described above. That is, first, the nanofiller 55 at a ratio of 15 wt % or more is mixed with the epoxy resin to produce a mixture having a viscosity of 100 P or more, and the dispersiveness of the nanofiller 55 can be finally greatly improved by a technique of causing the mixture having a high viscosity to be subjected to high shear mixing. The improvement of the dispersiveness of the nanofiller 55 realizes improvement of the viscosity stability of the resin 47 (suppression of viscosity increase with time).

As described above, according to the present embodiment, it is possible to produce the resin 47 having high dispersiveness and high viscosity stability of the nanofiller 55. This makes it possible to efficiently produce a high-performance insulating structure.

The above-described embodiment of the present invention does not limit the scope of the invention, and is merely an example included in the scope of the invention. In an embodiment of the present invention, for example, at least part of the specific application, structure, shape, operation, and effect may be changed, omitted, or added to the above-described embodiment without departing from the gist of the invention.

EXPLANATIONS OF LETTERS OR NUMERALS 1 rotary electric machine
5 bearing
6 frame
7 bearing bracket
10 rotor
11 rotor shaft
12 rotor core
20 stator 21 stator core
22 insulating coil
31 laminated conductor (conductor)
31A conducting wire
33 turn insulating portion
35 main insulating portion
40 main insulating tape (tape-shaped member)
41 main insulating layer
42 fiber reinforced layer
43 polymer layer
47 resin
50 impregnated portion
55 nanofiller
60 impregnation device
61 container
62 exhaust pipe
62A exhaust valve
63 supply pipe
63A supply valve
64 treatment tank
65 pressurized gas
90 stator unit
101 to 103 test piece
111 electrode
112 voltage generator
113 ground electrode
T electric tree

The invention claimed is:

1. A method of producing an insulating structure formed on an outer peripheral portion of a conductor, the method comprising:
a resin production step of producing a resin including a nanofiller; and
a step of impregnating a non-conductive tape-shaped member wound around the outer peripheral portion of the conductor with the resin, wherein
the resin production step includes:
a filler mixing step of mixing the nanofiller at a ratio of 15 wt % or more with an epoxy resin to form a mixture;
a shear mixing step of mixing the mixture to disperse the nanofiller in the mixture by shear mixing;
a diluent mixing step of mixing a reactive diluent that reduces a viscosity of the epoxy resin, with the mixture after the shear mixing step, and
a curing agent mixing step of mixing an acid anhydride curing agent with the mixture after the diluent mixing step,
wherein the resin production step further comprising a dispersiveness evaluation step of evaluating dispersiveness of the nanofiller in the mixture after the diluent mixing step, and
wherein the curing agent mixing step is performed when dispersiveness of the nanofiller is evaluated to satisfy a predetermined criterion in the dispersiveness evaluation step.

2. The method of producing the insulating structure according to claim 1, wherein
the mixture after the filler mixing step has a viscosity of 100 P or more.

3. The method of producing the insulating structure according to claim 2, wherein
the mixture after the diluent mixing step has a viscosity of 10 P or less.

4. The method of producing the insulating structure according to claim 1, wherein
the epoxy resin includes an alicyclic epoxy resin.

5. The method of producing the insulating structure according to claim 4, wherein
the reactive diluent includes butyl glycidyl ether.

6. A method of producing a resin with which an insulating structure formed on an outer peripheral portion of a conductor is impregnated, the method comprising:
mixing a nanofiller at a ratio of 15 wt % or more with an epoxy resin to form a mixture;
mixing the mixture to disperse the nanofiller in the mixture by shear mixing;
mixing a reactive diluent that reduces a viscosity of the epoxy resin, with the mixture after the shear mixing; and
mixing an acid anhydride curing agent with the mixture after mixing the reactive diluent,
wherein evaluating dispersiveness of the nanofiller in the mixture is performed after mixing the reactive diluent, and
wherein mixing the acid anhydride curing agent with the mixture is performed when dispersiveness of the nanofiller is evaluated to satisfy a predetermined criterion by evaluating dispersiveness of the nanofiller.

7. The method of producing a resin according to claim 6, wherein
the mixture after mixing the nanofiller has a viscosity of 100 P or more.

8. The method of producing a resin according to claim 7, wherein
the mixture after the diluent mixing step has a viscosity of 10 P or less.

9. The method of producing a resin according to claim 6, wherein
the epoxy resin includes an alicyclic epoxy resin.

10. The method of producing a resin according to claim 9, wherein
the reactive diluent includes butyl glycidyl ether.

* * * * *